G. A. LANE.
PIPE TONGS.
APPLICATION FILED JUNE 28, 1910.

994,169.

Patented June 6, 1911.

Witnesses.

Inventor:
George A. Lane.
Attys.

UNITED STATES PATENT OFFICE.

GEORGE A. LANE, OF FLORENCE, CALIFORNIA, ASSIGNOR TO ANNIE M. LANE, OF BURBANK, CALIFORNIA.

PIPE-TONGS.

994,169. Specification of Letters Patent. Patented June 6, 1911.

Application filed June 28, 1910. Serial No. 569,315.

*To all whom it may concern:*

Be it known that I, GEORGE A. LANE, a citizen of the United States, residing at Florence, county of Los Angeles, State of California, have invented certain new and useful Improvements in Pipe-Tongs, of which the following is a specification.

This invention relates to pipe tongs which are used for screwing together sections of pipe and the device is particularly useful in attaching the sections of oil well casings.

In its construction the device comprises a jaw which is adapted to engage the face of the pipe so as to hold the tongs against slipping.

The object of the invention is to provide a construction whereby upon the reverse movement of the tongs the teeth of this jaw withdraw from contact with the surface of the pipe. In this way I prevent the teeth from wearing away. In practice where the teeth rub on the surface of the pipe as suggested the teeth must be replaced with great frequency.

A further object of the invention is to provide a construction in which the chain which passes around the pipe will always be taut in spite of the slight lengthening of the chain which may occur as the chain wears.

Figure 1:
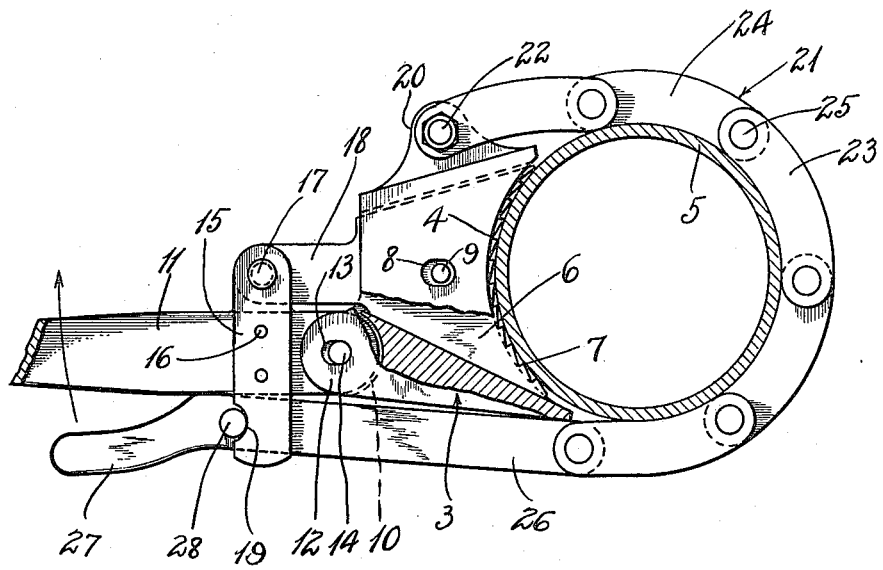
Figure 2:
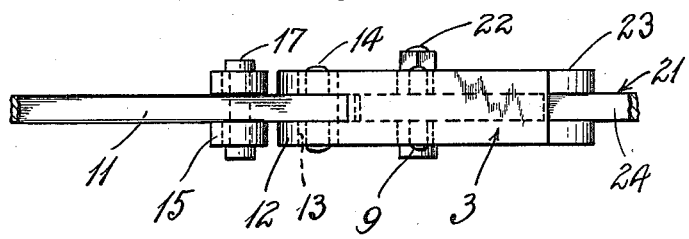

In the drawing forming a part of the annexed specification, Figure 1 is a plan of the device certain parts being broken away and showing the device applied to a well casing which is shown in cross section. Fig. 2 is a side elevation showing a portion of the lever and showing the shoe to which the lever attaches, the chain being broken away.

Referring more particularly to the parts, 3 represents a shoe which is in the form of a block of reduced width near its outer side and presenting a concave forward edge 4 which fits approximately to the curvature of the surface of the pipe casing. This shoe is hollow and forms a tapered or wedge shaped pocket which receives the main jaw 6, said main jaw having teeth 7 arranged in a concave arc so as to bite the face of the pipe as shown.

The upper and lower walls of the shoe 3 are formed with slots 8 which extend substantially in a radial direction with respect to the center of the pipe casing and into these slots 8 fixed pins 9 project from the sides of the main jaw as indicated. These pins prevent the dislodgment of the main jaw from the shoe.

At one side the shoe 3 near its rear edge is formed with a socket 10 which receives the inner end of a lever 11, said socket presenting ears 12 at the sides thereof which are formed with slots 13 and these slots receive the ends of a pin 14 which projects through the lever 11 as shown. Adjacent to this point lever 11 is provided with cross bars 15 which are rigidly secured thereto by rivets 16 as shown. These bars project at each side of the lever 11 and on one side they are connected by a pivot pin 17 with a shank 18, which extends rearwardly from the rear edge of the main jaw. On the other side the bars 15 are provided with notches or recesses 19 on the edge remote from the pipe casing.

On the side remote from the pocket 10 a lug 20 projects from the shoe and to this lug the end of a chain 21 is attached by a removable pivot bolt 22. This chain 21 is formed of double links 23 and intermediate or single links 24 which are attached together in alternating arrangement by pivot pins 25. These links are curved and present their concave edge against the face of the pipe so that these links operate as jaws or jaw links to clamp the pipe. To the end of this shank 21 an arm 26 is attached and this arm has a handle 27 at its upper end adjacent to which the arm is provided with a transverse pin 28 which is adapted to engage in the notches 19 when the arm is passed into the space between the bars 15.

In using the tongs the concave edge 4 of the shoe 3 is applied to the side of the pipe as indicated and the chain 21 is then passed around the pipe. The handle 27 is then manipulated so as to hook the pins 28 into the notches 19 and the lever 11 is then pulled in the direction indicated by the arrow in Fig. 1. In this movement the lever rocks on the pin 14 as the fulcrum forces the main jaw 6 against the side of the pipe. Rocking the lever in this direction pulls on the arm 26 and drives the chain 21 taut around the pipe. In this way the pipe is very securely gripped by the tongs so that it will be rotated by the lever. On the reverse movement of the lever 11 to take a new grip upon the pipe, it will be seen that the lever will rock slightly upon the pin 14 in a reverse direction, and the cross bars 15 will pull the main jaw 6 outwardly so that it will withdraw into the shoe 3, and in this way the teeth 7 will be brought out of contact with the surface of the pipe while the concave edge 4 of the shoe rests upon the pipe. This reverse movement of the lever will also evidently slacken up the chain 21 so that the links will not exert any gripping pressure on the pipe. As soon as the lever is pulled in a forward direction such as indicated by the arrow in Fig. 1 the pipe tongs will immediately grasp the pipe in the manner described above.

The slots 13 are for the purpose of giving a slight play at the point 14 to give an increased movement in taking up the slack of the chain 21.

Special attention is called to the curvature of the inner edges of the links of the chain 21. On account of this curvature the links grip the surface of the pipe very effectively and develop an enormous friction tending to prevent the slipping of the chain when the main jaw is applied in a forward movement.

What I claim is:—

1. A device of the class described having a shoe with an edge lying adjacent to the side of the pipe, a movable jaw mounted in said shoe having teeth adapted to engage the pipe and normally projecting beyond said edge of said shoe, a lever, means in connection with said lever and said jaw for clamping the pipe on a forward movement of said lever, said edge of said shoe resting against the face of said pipe when the teeth of said jaw withdraw from contact with the pipe, on a reverse movement of said lever.

2. A device of the class described having a shoe adapted to engage the face of the pipe, a main jaw movably mounted in said shoe having teeth adapted to engage the face of the pipe, a lever mounted on said shoe adapted to apply said main jaw to the pipe on the forward movement of said lever, and means attached to said shoe and to said lever for clamping the side of the pipe opposite to said main jaw on a forward movement of said lever.

3. A device of the class described having a shoe with a pocket therein, a main jaw received in said pocket and having a limited movement therein, said jaw having teeth adapted to engage the face of the pipe when said jaw is pressed toward the pipe and adapted to withdraw into said pocket when said main jaw is moved away from the pipe, a lever mounted on said shoe and connected with said main jaw, and means in connection with said shoe and said lever for clamping the side of the pipe opposite to said main jaw.

4. A device of the class described comprising a shoe adapted to seat against the side of the pipe, a main jaw received in said shoe and having a pin and slot connecting therewith, said jaw having teeth on the inner edge thereof adapted to engage the pipe and adapted to withdraw from contact with the pipe upon a forward movement of said jaw into said shoe, a lever having a pin and slot connection with said shoe, means for pivotally connecting said jaw on one side of said lever and a chain attached to one side of said shoe and having links presenting curved edges engaging the side of the pipe, and means for connecting said chain with said lever on the side opposite to said jaw.

5. A device of the class described having a movable jaw with teeth adapted to engage the side of the pipe, a shoe connected to said jaw, and contacting with the pipe, a movable member adapted to clamp said jaw against the pipe when moved in a forward direction, said jaw being arranged to withdraw said teeth from contact with the pipe upon a reverse movement of said movable member.

6. A device of the class described having a shoe adapted to seat against the side of the pipe, a movable jaw mounted on said shoe having teeth normally projecting beyond the face of said shoe, which is adjacent to the pipe, said jaw being adapted to withdraw outwardly on said shoe in the direction away from the pipe, a chain attached to said shoe, and having a plurality of curved links passing around the pipe and engaging the face thereof, and a lever pivoted on said shoe, and connecting said jaw and said chain for forcing said jaw against the pipe and taking up the tension of said chain.

In witness that I claim the foregoing I have hereunto subscribed my name this 22nd day of June, 1910.

G. A. LANE.

Witnesses:
F. D. AMMEN,
EDWARD A. STRAUSE.

---

Copies of this patent may be obtained for five cents each, by addressing the "Commissioner of Patents, Washington, D. C."